Figure 6:
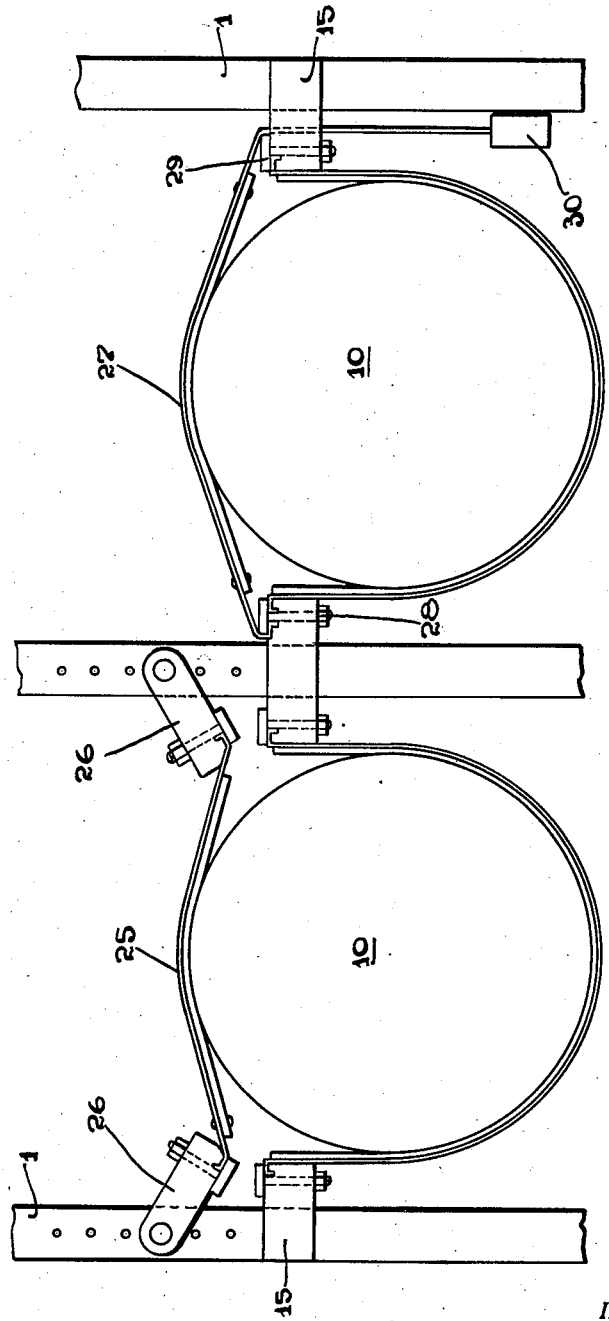

Dec. 24, 1935.   L. V. BLACK   2,025,086
APPARATUS FOR USE IN CASE HARDENING GLASS
Filed Dec. 4, 1934   6 Sheets-Sheet 1
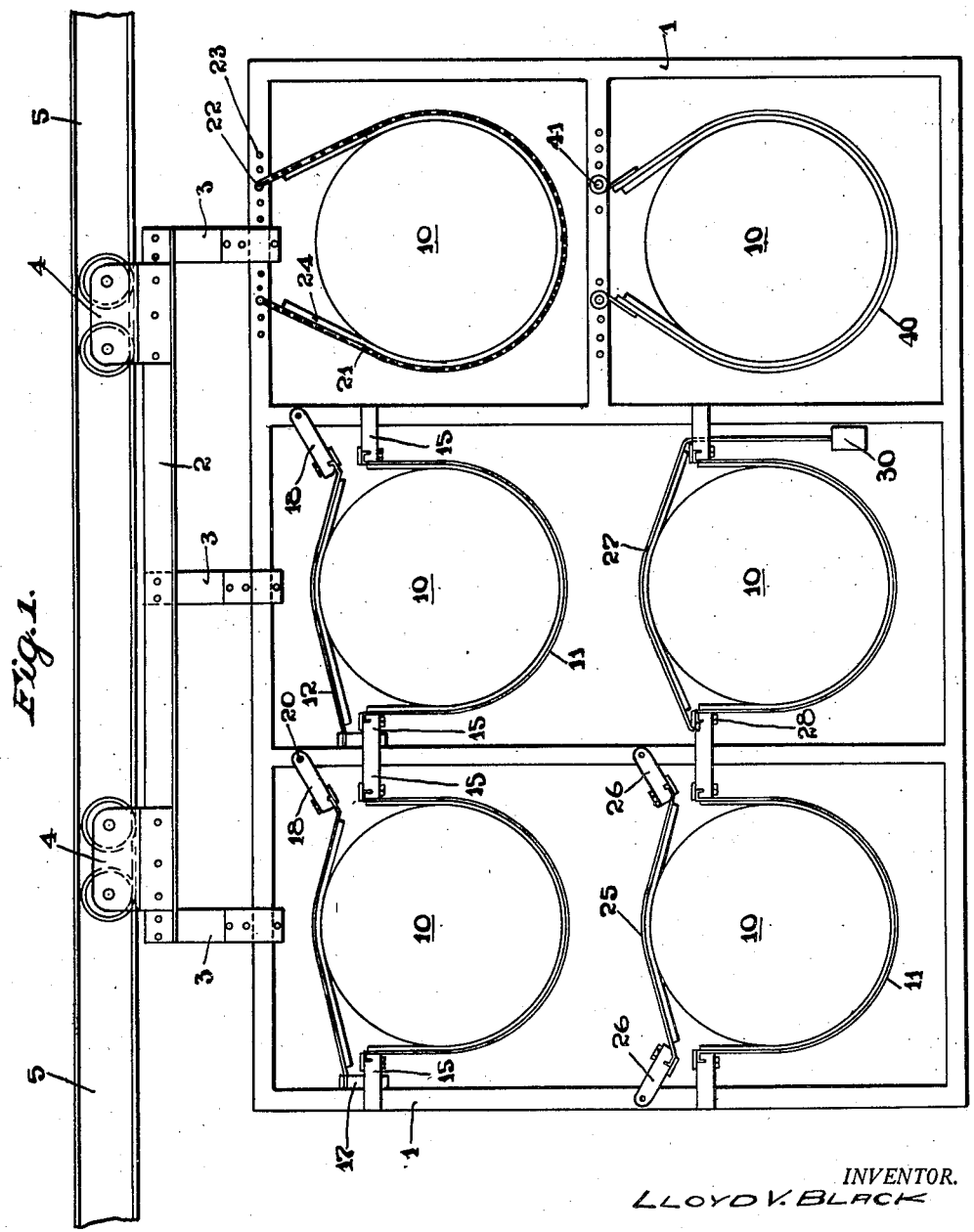
INVENTOR.
LLOYD V. BLACK
BY Bradley + Bee
ATTORNEYS.

Dec. 24, 1935.    L. V. BLACK    2,025,086
APPARATUS FOR USE IN CASE HARDENING GLASS
Filed Dec. 4, 1934    6 Sheets-Sheet 2
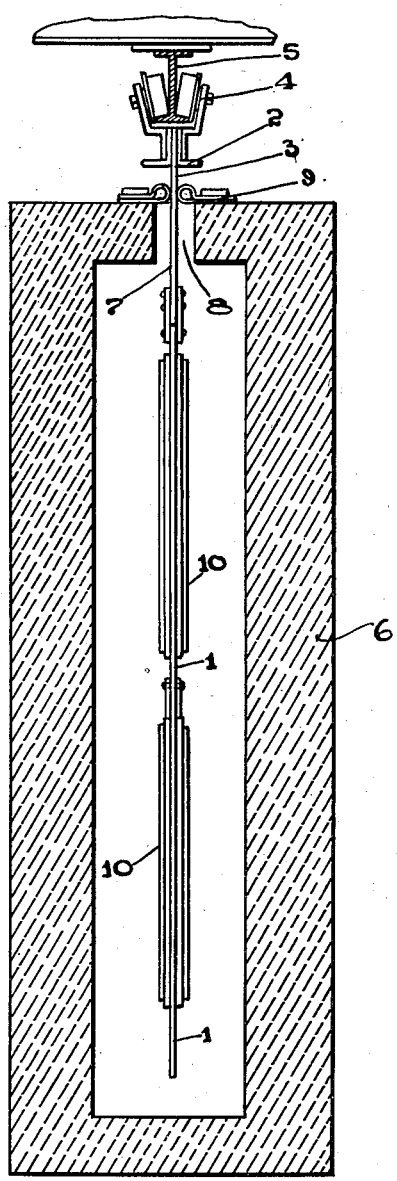
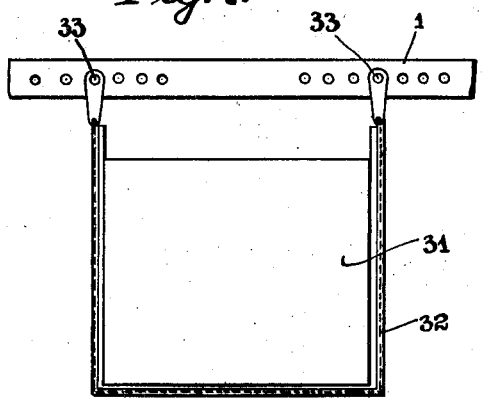
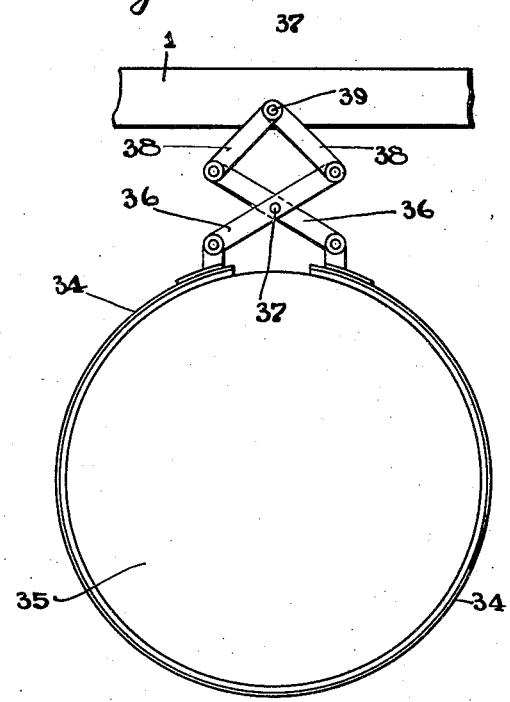
INVENTOR.
LLOYD V. BLACK
BY
ATTORNEYS.

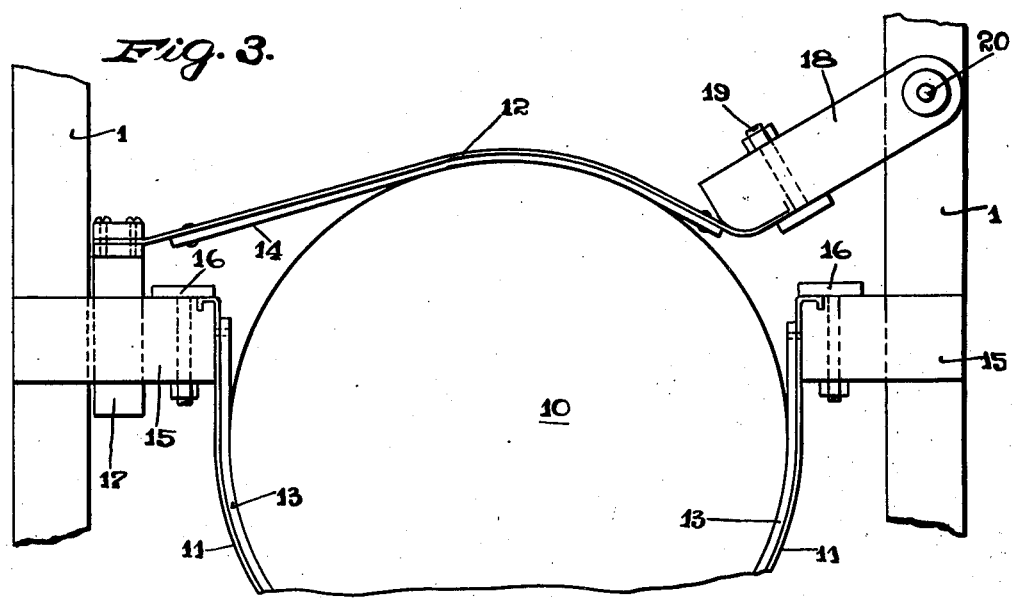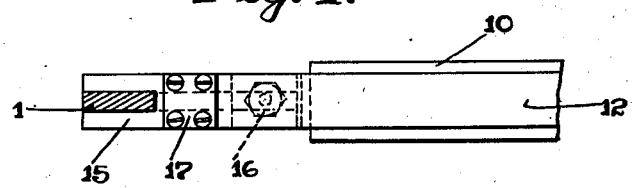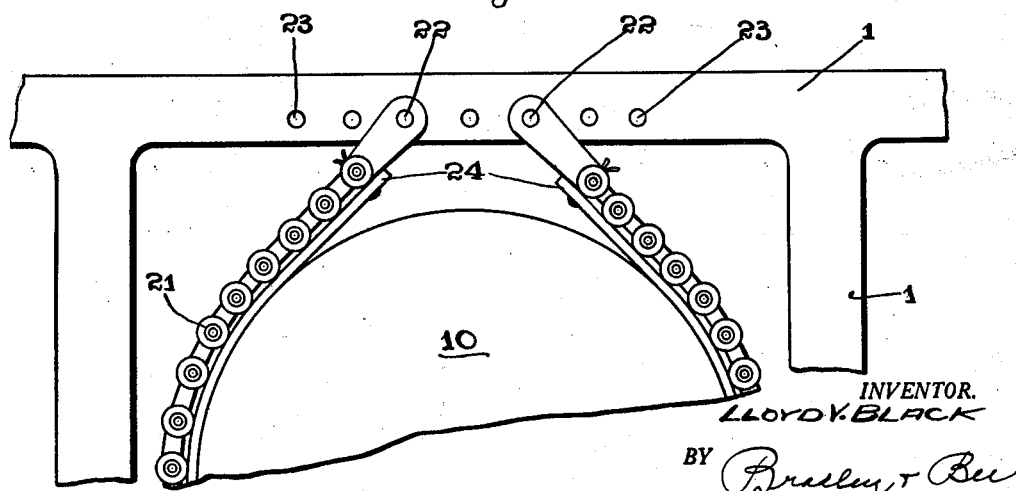

Dec. 24, 1935.   L. V. BLACK   2,025,086
APPARATUS FOR USE IN CASE HARDENING GLASS
Filed Dec. 4, 1934   6 Sheets-Sheet 4

INVENTOR.
LLOYD V. BLACK
BY Bradley + Bee
ATTORNEYS.

Dec. 24, 1935. L. V. BLACK 2,025,086
APPARATUS FOR USE IN CASE HARDENING GLASS
Filed Dec. 4, 1934 6 Sheets-Sheet 5
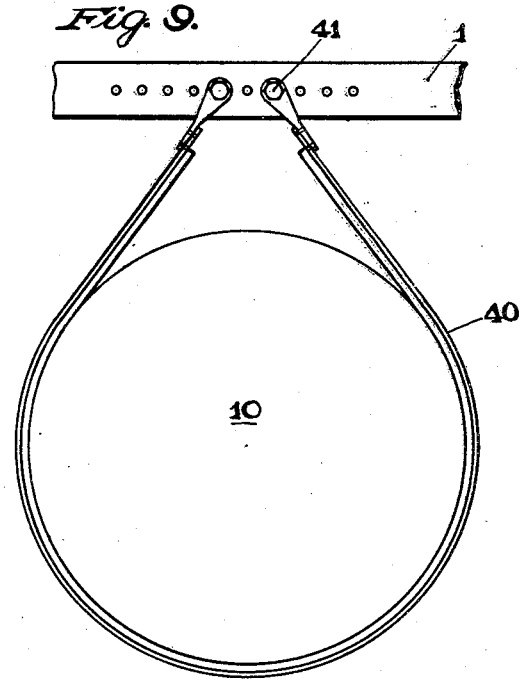
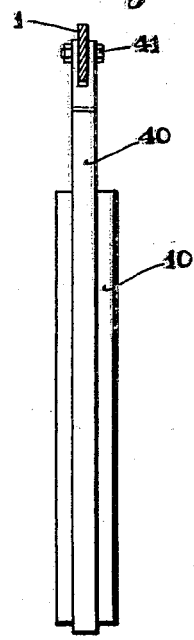
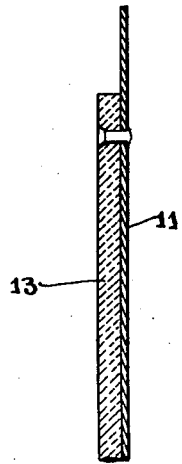
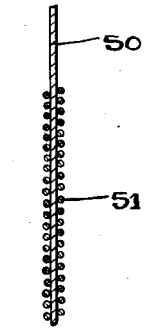
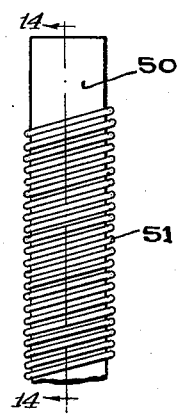
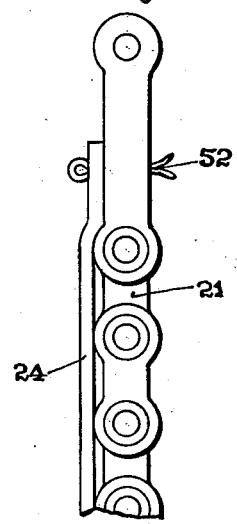
INVENTOR.
LLOYD V. BLACK
BY *Bradney & Bee*
ATTORNEYS.

Dec. 24, 1935.　　　　L. V. BLACK　　　　2,025,086
APPARATUS FOR USE IN CASE HARDENING GLASS
Filed Dec. 4, 1934　　　6 Sheets-Sheet 6
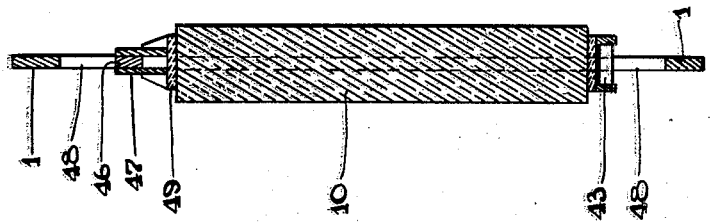
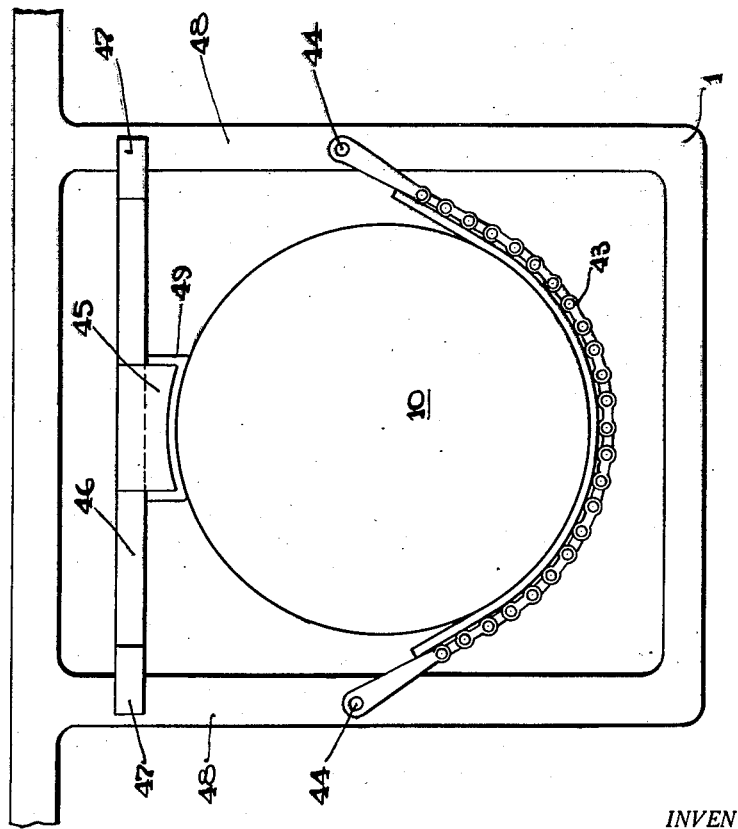
INVENTOR.
LLOYD V. BLACK
BY
ATTORNEYS.

Patented Dec. 24, 1935

2,025,086

UNITED STATES PATENT OFFICE 2,025,086

APPARATUS FOR USE IN CASE HARDENING GLASS

Lloyd V. Black, Tarentum, Pa., assignor to Pittsburgh Plate Glass Company, a corporation of Pennsylvania Application December 4, 1934, Serial No. 755,936

10 Claims. (Cl. 49—45)

The invention relates to apparatus for case hardening glass wherein the glass is heated to a temperature approximating the softening point and then chilled quickly by the application of air blasts, and particularly to the means for supporting the glass during the heating and chilling operations. The invention has for its principal objects the provision of improved means for supporting the glass, and particularly curved shapes, very securely without marring the glass and without causing breakage. A further object is the provision of supporting means which is adaptable to different sized plates and to plates of widely varying form, and which can be easily and quickly applied to the plates and removed therefrom. Certain embodiments of the invention are illustrated in the accompanying drawings, wherein:

Figure 1 is a side elevation of the rack and supporting means for a series of port lights which are to be case hardened. Fig. 2 is a section through the heating furnace with the rack in end elevation. Figs. 3 and 4 are detail views on an enlarged scale, Fig. 3 being a side elevation, and Fig. 4 a fragmentary plan view. Figs. 5, 6, 7 and 8 are side elevations showing modifications. Figs. 9 and 10 illustrate a further modification, Fig. 9 being a side elevation and Fig. 10 an end elevation. Figs. 11 and 12 illustrate another modification, Fig. 11 being a side elevation and Fig. 12 a vertical section. And Figs. 13 to 16 are detail views showing the means of applying insulating material to the metal bands.

Referring to Figs. 1 and 2, 1 is a frame or rack supported from the bar 2 by means of the hangers 3, the bar 2 being in turn carried by the trolleys 4, 4 mounted for movement along the rail 5. This rail extends longitudinally of the heating kiln or furnace 6 shown in Fig. 2, the hangers 7 passing through a slot 8 at the top of the furnace, at which point sheets of asbestos 9 are employed to make a seal.

The glass port lights 10 may be supported in a variety of ways in the frame or rack 1, as indicated in Fig. 1, and it is to these means of support that the invention particularly relates. One of these forms of support is shown in detail in Figs. 3 and 4 and involves the use of the metal band 11 in the form of a depending loop extending around the lower portion of the plate 10 and the band 12 extending across the upper portion of the plate. These bands are preferably made of thin refractory metal, such as nickel chromium, which are insulated from the glass by means of facing strips 13, 14 of refractory material of low conductivity, such as asbestos. The ends of the band 11 are secured to the supporting blocks 15, 15 carried by the frame 1 by means of the clamping bolts 16. The band 12 is secured at one end to the block 17 carried by the member 15 and at its other end is secured to the arm 18 by means of the bolt 19. The bar 18 is pivoted to the frame at 20 and its weight serves to tension the band 12 so that such band presses against the top of the glass plate and prevents it from tilting laterally in the lower band 11. This arrangement gives secure support for the glass plate, and one which has no tendency to cause breakage. A further advantage incident to the construction is the ease with which the plates may be positioned and removed from the supporting means.

In the construction shown in Fig. 5, the supporting band is in the form of a chain 21 secured at its ends to the frame 1 by means of the bolts 22, 22. For the purpose of adjustment, and in order to permit the support of port lights of varying diameter, the additional bolt holes 23 are provided in the frame. The inner face of the chain is lined with a layer of asbestos 24 similar to that employed with the bands of the construction heretofore described.

Fig. 6 illustrates two further modifications in the tensioning means for the band which extends over the upper portions of the port lights. In the device on the left hand side of Fig. 6, each end of the band 25 is secured to a pivoted arm 26 so that the band is tensioned at each end instead of only at one end, as shown in the Fig. 3 construction. In the construction on the right hand side of Fig. 6, the band 27 which is secured at one end by the bolt 28 has its other end extended past the block 29 and provided with a weight 30 serving to apply the necessary tension to the band.

Fig. 7 illustrates the application of the invention to the support of a square plate 31, this being accomplished by means of the chain 32 secured at its upper ends to the bolts 33. The chain is much better adapted to the support of a plate of rectangular shape than a sheet metal band, since it is more flexible. This construction lends itself readily to adjustment for supporting a wide variety of plates of different shapes and sizes.

In the construction shown in Fig. 8, only a single supporting band 34 is employed for the plate 35. The ends of this band are secured to the lower ends of the levers 36, 36, pivoted together at 37 and also pivoted at their upper ends to the links 38, 38. These links are pivoted at 39 to the frame. The weight of the plate tends to cause the lower ends of the levers 36, 36 to approach each other so that the band is caused to grip the plate and hold it securely. Various other forms of link supports may be substituted for this toggle arrangement for accomplishing the same result, namely to cause the ends of the band to move toward each other due to the weight of the glass.

The construction of Figs. 9 and 10 is similar to that of Fig. 5 except that the band 40 is of refractory sheet metal, such band being lined with asbestos and supported at its upper ends upon the bolts 41, 41.

In the construction shown in Figs. 11 and 12, the lower portion of the glass plate is supported by the chain 43 secured at its ends upon the pins 44, 44. The upper portion of the glass plate is held by the block 45 supported upon the bar 46. This bar is provided at each end with a pair of clips 47 which slidably engage the bars 48, 48 constituting part of the supporting frame or rack. The face of the chain has an asbestos liner, as in the other forms of construction, and a layer 49 of asbestos is provided upon the lower face of the block 45.

Figs. 13 to 16 illustrate different methods of applying the insulating material to the flexible bands. In the Fig. 13 construction, the band 11 is provided with a sheet of asbestos 13, as heretofore described. In the construction shown in Figs. 14 and 15, the metal band 50 is insulated by means of an asbestos cord 51 which is wound around the band, as indicated in the drawings. Fig. 16 shows the application of the strip of asbestos 24 to the chain 21, such asbestos being secured at its ends by means of the cotter pins 52.

In operation, the glass plates 10 to be case hardened are supported in the frame 1 by any one or more of the devices shown and then moved into and through the kiln or furnace 6 where the glass is heated to approximately the softening point. The frame is then moved out of the furnace where the glass plates are subjected to a chilling action by blasts of air or are chilled by any other suitable means.

What I claim is:

1. Means for supporting a glass plate during a case hardening operation, comprising supporting means and a flexible metal band secured at its ends to said means depending therefrom and forming a loop which fits around and conforms itself to the periphery of the glass plate.

2. Means for supporting a glass plate during a case hardening operation, comprising a pair of spaced supports, a flexible metal band secured at its ends to the supports depending therefrom and forming a loop which fits around and conforms itself to the periphery of the glass plate, and an additional support for the upper part of the plate comprising means yieldingly engaging the periphery of such upper part of the plate and maintained in the same vertical plane as the loop.

3. Means for supporting a glass plate during a case hardening operation, comprising a pair of spaced supports, a flexible metal band secured at its ends to the supports depending therefrom and forming a loop which fits around and conforms itself to the periphery of the glass plate, and an additional support for the upper part of the plate comprising a second metal band extending around the periphery of the upper portion of the plate in the same vertical plane as said loop, and means for tensioning such second band.

4. Means for supporting a glass plate during a case hardening operation, comprising a pair of spaced supports, a flexible metal band secured at its ends to the supports depending therefrom and forming a loop which fits around and conforms itself to the periphery of the glass plate, an additional support for the upper part of the plate comprising a second metal band extending around the periphery of the upper portion of the plate in the same vertical plane as said loop, and gravity means for tensioning such second band.

5. Means for supporting a glass plate during a case hardening operation, comprising supporting means and a flexible metal band secured at its ends to said means depending therefrom and forming a loop which fits around and conforms itself to the periphery of the glass plate, said band being formed of thin refractory sheet metal.

6. Means for supporting a glass plate during a case hardening operation, comprising supporting means and a flexible metal band secured at its ends to said means depending therefrom and forming a loop which fits around and conforms itself to the periphery of the glass plate, said band being formed of a plurality of links pivoted together.

7. Means for supporting a glass plate during a case hardening operation, comprising supporting means and a flexible metal band secured at its ends to said means depending therefrom and forming a loop which fits around and conforms itself to the periphery of the glass plates, said band being formed of thin refractory sheet metal, and lined with a refractory insulating material of low heat conductivity.

8. Means for supporting a glass plate during a case hardening operation, comprising supporting means and a flexible metal band secured at its ends to said means depending therefrom and forming a loop which fits around and conforms itself to the periphery of the glass plate, said band being formed of a plurality of links pivoted together and lined with refractory insulating material of low heat conductivity.

9. Means for supporting a glass plate during a case hardening operation, comprising a pair of brackets, toggle supporting means therefor causing the brackets to move toward each other when weight is imposed thereon, and a flexible metal band secured at its ends to said brackets depending therefrom and forming a loop which fits around and conforms itself to the periphery of the glass plate.

10. Means for supporting a glass plate during a case hardening operation comprising a pair of brackets, a flexible metal band encircling the plate and having its ends in proximity at the upper edge of the plate and links between the brackets and the ends of the band arranged so that the weight of the plate tends to cause such ends to approach each other and apply tension to the band.

LLOYD V. BLACK.